United States Patent
Lueckhoff

(10) Patent No.: US 8,005,900 B2
(45) Date of Patent: Aug. 23, 2011

(54) RETRIEVING INFORMATION FOR PROCESSING A RECEIVED ELECTRONIC MESSAGE

(75) Inventor: Hermann Lueckhoff, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1513 days.

(21) Appl. No.: 10/814,832

(22) Filed: Mar. 31, 2004

(65) Prior Publication Data

US 2005/0223060 A1    Oct. 6, 2005

(51) Int. Cl.
*G06F 15/16* (2006.01)

(52) U.S. Cl. .................. 709/206; 709/204; 707/999.107

(58) Field of Classification Search .................. 709/206, 709/204, 218, 223–224; 707/999.107, E17.006, 707/E17.032, E17.125, 999.1, 999.102
See application file for complete search history.

(56) References Cited

U.S. PATENT DOCUMENTS

| 5,917,489 A | 6/1999 | Thurlow et al. | |
| 7,130,885 B2 * | 10/2006 | Chandra et al. | 709/206 |
| 2004/0064512 A1 * | 4/2004 | Arora et al. | 709/206 |

FOREIGN PATENT DOCUMENTS

WO    WO01/06435    1/2001

OTHER PUBLICATIONS

Siebel Product Description, "Siebel email Response Value Proposition", printed from htt://www.siebel.com/products/service/web_serive/email_response on Oct. 23, 2003, 6 pages.

* cited by examiner

*Primary Examiner* — Peling A Shaw
(74) *Attorney, Agent, or Firm* — Fish & Richardson P.C.

(57) ABSTRACT

System and techniques are described for retrieving information relating to a received electronic message. Upon receipt of an incoming electronic message in a computer system, meta information stored in the computer system is accessed. The meta information identifies a first pre-selected class of a plurality of classes of stored fact information. A portion of the stored fact information that is a member of the first pre-selected class is retrieved. The retrieved portion of the stored fact information is stored in an electronic file that is associated with the incoming electronic message such that a rule for processing the incoming electronic message can be applied to the retrieved portion.

20 Claims, 4 Drawing Sheets

RETRIEVING INFORMATION FOR PROCESSING A RECEIVED ELECTRONIC MESSAGE

TECHNICAL FIELD

This description relates to automatically retrieving information for processing a received electronic message.

BACKGROUND

Many organizations allow customers, business partners and others to communicate with them using electronic messages such as email. Some such organizations find themselves receiving large volumes of messages each day, and may therefore have implemented one of the currently available email response management systems. Such a system may handle 400,000 or more incoming customer email messages each day. These incoming email messages may relate to any number of different business scenarios or processes. For example, certain customers may submit service order requests to their service provider via email. Other customers may submit complaints or assistance requests to certain providers via email. If there is a very large volume of such received messages and there is great diversity in the nature of the individual messages, then such a system's usefulness will depend largely on how intelligently it is able to process the messages.

One approach is to provide automatic processing of the incoming email messages. In this approach, the system attempts to automatically analyze the content of the messages in a semantic way, perhaps using a rule-based engine in generating an acknowledgement or response message to send back to the customer. The implementation of such an approach may be quite difficult because a sophisticated linguistic analysis may be required, and because the complex knowledge management systems that implement such an approach may be difficult and expensive to maintain.

Another approach is to provide a certain level of automated processing of the email messages in combination with user intervention. The system may be able to partially analyze or categorize the incoming email messages, and the user may then make subsequent decisions on how to route or respond to the messages.

Existing systems using either of these approaches, however, may have disadvantages in their processing of received messages. Such systems may take into account only a limited scope of information relating to the processed message. Moreover, they may be restricted in the way they apply processing rules to the information they retrieve. That is, while existing systems may be able to gather information relating to a particular message and use that information in deciding how to process the message, they may not be flexible enough to provide a sufficient business context for processing the received message. Accordingly, these systems may yield unsatisfactory results in some situations.

SUMMARY

The invention relates to retrieving information for processing a received electronic message.

In a first aspect, a method comprises, upon receipt of an incoming electronic message in a computer system, accessing meta information stored in the computer system that identifies a first pre-selected class of a plurality of classes of stored fact information. A portion of the stored fact information that is a member of the first pre-selected class is retrieved. The retrieved portion of the stored fact information is stored in an electronic file that is associated with the incoming electronic message such that a rule for processing the incoming electronic message can be applied to the retrieved portion.

In selected embodiments, the meta information includes the rule and a fact attribute identified by the rule, the fact attribute identifies the first pre-selected class of stored fact information. Accessing the meta information may comprise accessing the rule and the fact attribute.

In selected embodiments, the retrieved portion of the stored fact information may pertain to at least one category selected from the group consisting of: a business context of the incoming electronic message, analytical data relating to the incoming electronic message, availability of a person for attending to the incoming electronic message, a skill of a person for attending to the incoming electronic message, communication information relating to the incoming electronic message, an industry with which the incoming electronic message is associated, and combinations thereof.

In a second aspect, a computer system comprises an electronic messaging system in which an incoming electronic message is received, a first repository with stored fact information, a second repository with meta information that identifies a first pre-selected class of a plurality of classes of the stored fact information, and a program product including executable instructions that when executed cause the computer system, upon receipt of the incoming electronic message, 1) to access the meta information in the second repository, 2) to use the meta information to retrieve a portion of the stored fact information from the first repository, the retrieved portion being a member of the first pre-selected class, and 3) to store the retrieved portion in an electronic file that is associated with the incoming electronic message such that a rule for processing the incoming electronic message can be applied to the retrieved portion.

In a third aspect, a method of configuring a computer system for responding to received electronic messages comprises receiving an input in a computer system, the input identifying a first user-selected class of a plurality of classes of stored fact information to be retrieved upon receipt in the computer system of at least one incoming electronic message. Meta information that identifies the first user-selected class is stored in a repository that is accessed upon receipt of the incoming electronic message such that a portion of the stored fact information that is a member of the first user-selected class can be retrieved upon accessing the meta information.

Advantages of the system and techniques described herein may include any or all of the following. Processing or handling of a received message may be improved. More relevant information for processing the message may be retrieved. A flexibility in the kind of information that may be retrieved for processing a message may be provided. A platform independent electronic file with information for processing a message may be provided. A programming-language independent electronic file with information for processing a message may be provided. Responses to received messages may be provided more quickly. Customer relation management may be improved. Computerized knowledge management may be improved.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

The examples below will be described in the context of the following general scenario. An organization receives a relatively large number of electronic messages in a more or less continuous flow and wishes to process the messages quickly and effectively so that each message can be dealt with appropriately. For example, the messages may be received at a generic email address such as info@name_of_organization.com or equivalent, which is used by many companies today. When a message is received, some or all of its contents are preferably automatically extracted and analyzed as a part of the processing. It may also be useful to retrieve information from other sources that relates to the message, because such information can be important in deciding what to do with the message. Based on the available information, one or more decisions on how to process the message will be made. For example, it may be decided to register the fact that the message was received and route it to an agent of the organization to handle the message. Preferably, the processing is done expediently so that there is no significant delay before the message is forwarded to its final recipient.

Figure 1:
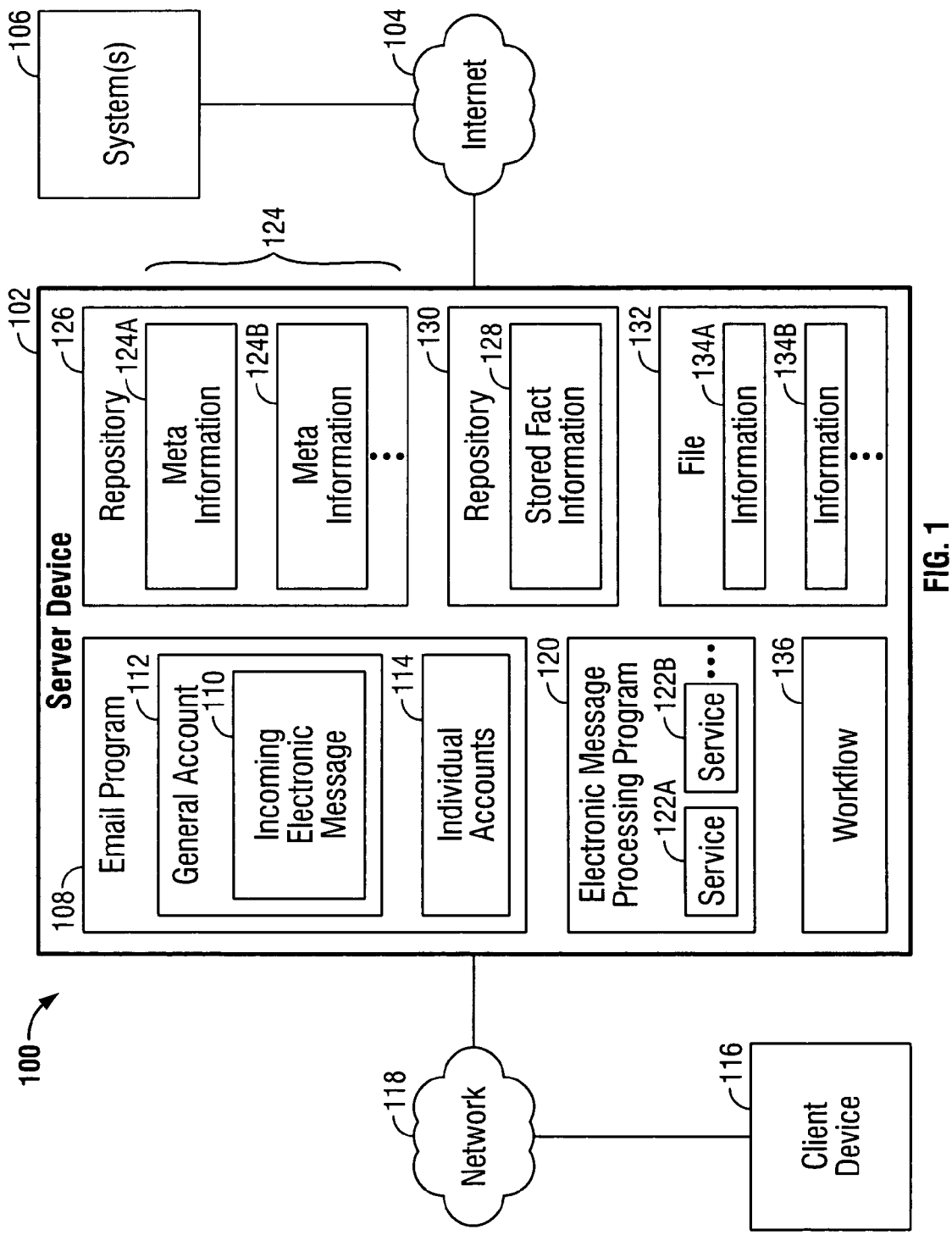
FIG. 1 is a block diagram of a computer system that processes a received electronic message.

FIG. 1 shows a computer system 100 that can receive, process and route electronic messages. A server device 102 is operably connected to the Internet 104, through which it can receive emails and other electronic messages sent from one or more system(s) 106 that are also connected to the Internet. The server device 102 includes an email program 108 in which received messages, such as an exemplary incoming electronic message (IEM) 110, are accessible. The IEM 110 is currently shown in a general account 112 that for example corresponds to the generic email address mentioned above. As will be described below, the IEM 110 will be processed to determine what action(s), if any, to take in response to receiving it. For example, the processing may lead to the IEM 110 being routed to one or more individual accounts 114 in the email program 108. The individual accounts 114 are assigned to persons working within the organization, and they may access their respective individual account 114 using a client device 116 that is connected to the server device 102 through a network 118. For clarity of description in this example, only a single IEM 110 is shown in the general account 112 but in an actual implementation there may be many thousands of messages, or even hundreds of thousands or more.

The server device 102 includes an electronic message processing program (EMPP) 120 that includes executable instructions for retrieving information that is relevant for deciding how to process the IEM 110. The EMPP 120 may include one or more services 122A, 122B, and so on, that are dedicated to the retrieval of specific portions of information. For example, the first service 122A includes executable instructions for retrieving a particular piece of fact information, the second service 122B includes executable instructions for retrieving another piece of fact information, and so on.

Upon receiving the IEM 110, the server device 102 will access meta information 124 in a first repository 126. The meta information 124 specifies which portion(s) of stored fact information 128, located in a second repository 130, that should be retrieved for processing the IEM 110. That is, the meta information 124 may identify which executable instruction in the EMPP 120 should be used.

The stored fact information 128 may include many separate classes of fact information, of which all, some, or only one is to be retrieved. There may therefore be separate portions of meta information 124, one for each class that is to be retrieved, so that the first repository 126 include first meta information 124A, second meta information 124B, and so on. The first meta information 124A may identify the first service 122A, the second meta information 124B may identify the second service 122B, and so on. Several examples of what may constitute the respective classes of stored fact information 128 are will be described below.

The portion(s) of the stored fact information 128 that the server device retrieves will be stored in an electronic file 132 that is associated with the IEM 110. Accordingly, the electronic file 132 may include first retrieved portion 134A of stored fact information, second retrieved portion 134B of stored fact information, and so on. The retrieved portions in the file 132 will be accessed for applying one or more rules to them to determine what action(s) to take with regard to the IEM 110, as will be described below. It will be understood that the system 100 can include one separate electronic file 132 for each incoming message that is being processed.

The beginning, duration and end of the processing of IEM 110 may be controlled by a workflow 136. That is, the workflow 136 may contain the overarching instructions that the server device 102 follows upon receiving the IEM 110, including the initiation of fact retrieval. Accordingly, the workflow 136 for the IEM 110 may be active from a time when the IEM 110 is received until the processing is finished. Several separate instances of the workflow 136 may be active if more than one incoming message is being processed.

Figure 2:
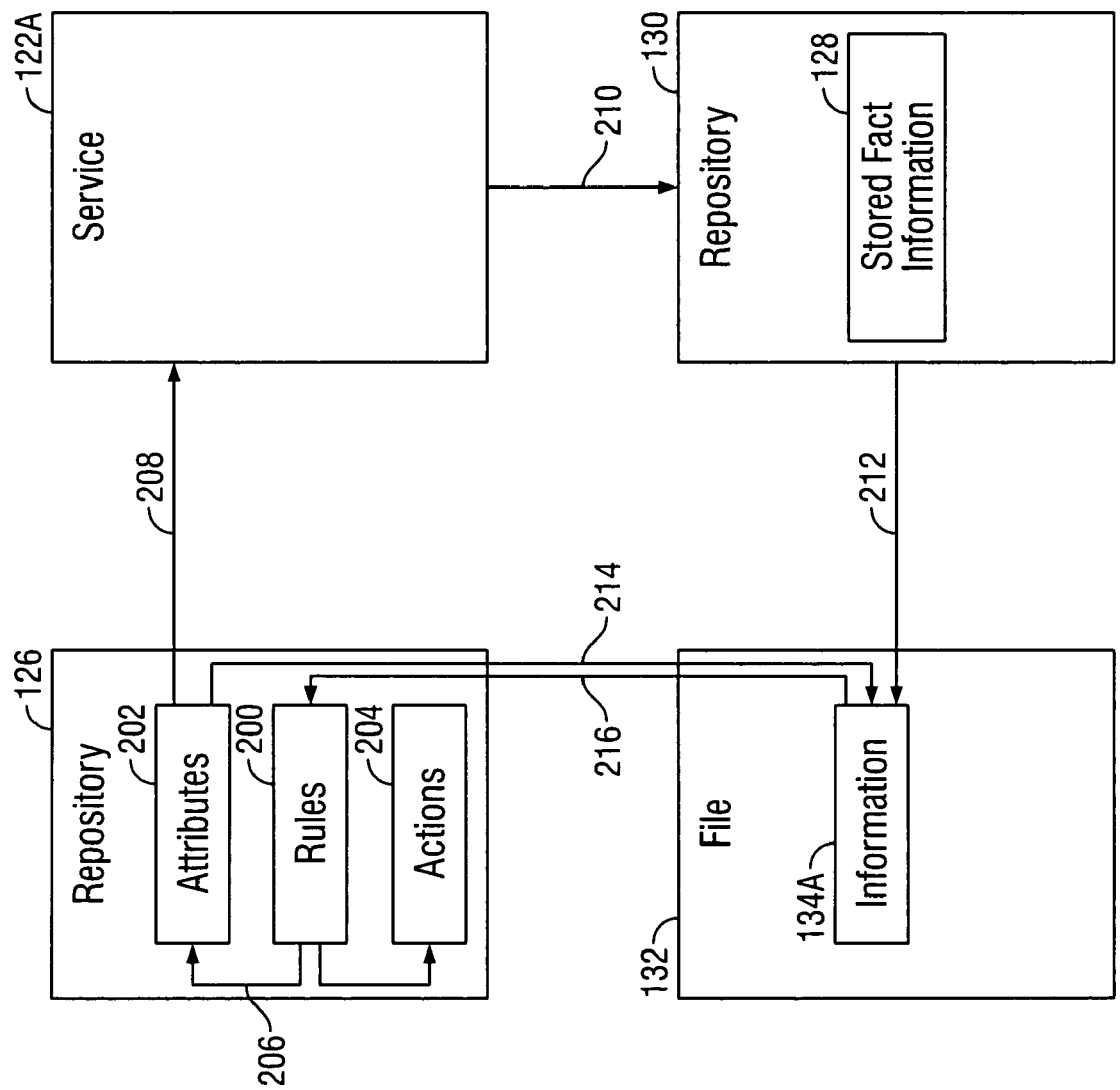
FIG. 2 is a block diagram of selected parts of the system shown in FIG. 1.

An example of fact retrieval, and process flows that may occur, will now be described with reference to FIG. 2, which includes some components of the system 100. Particularly, the first repository 126 includes rules 200, fact attributes 202 and actions 204, all of which are pre-selected to be used in processing the IEM 110, and the application of certain rules may be conditioned on the outcome of another rule. Upon receiving the IEM 110, therefore, the server device 102 may access the rules 200 sequentially to determine the facts needed to evaluate them.

Particularly, the rules 200 may be arranged in what can be thought of as a tree structure, where the outcome of applying the top rule to its particular fact(s), retrieved specifically with regard to the IEM 110, determines which rule to access in the second layer of rules in the tree structure, and so on. Thus, the server device 102 may work its way down in such a structure of rules until all applicable rules have been evaluated. This may lead to the retrieval of a certain amount of relevant fact information for the IEM 110. As an outcome of applying the rules to the retrieved information, one or more specific actions for processing the IEM 110 may then be performed.

Each of the rules 200 identifies one of the fact attributes 202 as being necessary for evaluating the rule, and the server device 102 will access the identified fact attribute to initiate the retrieval of the fact(s) to which the fact attribute corresponds. The specific rule 200 and the fact attribute 202 that it identifies are examples of the meta information 124. The meta information 124 identifies a pre-selected class of stored fact information that is to be retrieved. Moreover, the first meta information 124A may correspond to a particular rule and to the fact attribute identified by it, the second meta information 124B may correspond to another rule and to the fact attribute identified by it, and so on. The step of accessing a specific attribute 202 is indicated by process flow arrow 206. The fact attribute corresponds to a specific class of the stored fact information 128. Particularly, the fact attribute in this example corresponds to a first class of stored fact information.

The first attribute 202 that is identified by the rule 200 includes an identifier that specifies where in the file 132 the retrieved information is to be stored. Later, when the information has been stored in file 132, the identifier may be used in accessing the information in the file.

The EMPP 120 contains instructions for retrieving the stored fact information. In particular, the first service 122A may be preconfigured with instructions for the task of retrieving the stored fact(s) corresponding to the present fact attribute. The retrieval of the identified fact(s) is initiated as indicated by process flow arrow 208. The first service 122A, in turn, is configured with instructions for retrieving in the second repository 130 at least a portion of the stored fact information 128 that falls within the first class of stored fact information. The server device 102 therefore accesses, as indicated by process flow arrow 210, the stored fact information 128 in the second repository 130. The server device then stores the retrieved portion of fact information in the electronic file 132 as indicated by process flow arrow 212.

In selected embodiments, the electronic file 132 is a document. For example, the electronic file 132 may be a document that is provided with Extensible Markup Language (XML) code. One advantage of such an implementation may be that the electronic file 132 becomes platform independent, meaning that the file 132 can be used and accessed regardless of the platform on which the server device 102 is based. Such an implementation may also provide that file 132 becomes programming-language independent, meaning that its operation and usefulness is not dependent on any particular programming language otherwise used in the server device 102. An exemplary section of an XML document that the file 132 could comprise is included in Table 1 below.

TABLE 1

```
- <xsl:template match="/parts">
    - <parts>
            <xsl:copy-of select="/parts/*" />
        - <EMAIL>
                <DOC_ID>FOL28000000007815RAW28000000005130</DOC_ID>
                <OBJECT_ID>RAW28000000005130</OBJECT_ID>
                <OBJ_TYPE>TXT</OBJ_TYPE>
                <OBJ_NAME>MESSAGE</OBJ_NAME>
                <OBJ_DESCR>HL Test</OBJ_DESCR>
                <OBJ_LANGU>E</OBJ_LANGU>
                <OBJ_SORT />
                <CREATOR_ID>USR28000000001130</CREATOR_ID>
                <CREAT_NAME>LUECKHOFFH</CREAT_NAME>
                <CREAT_FNAM>Hermann Lueckhoff</CREAT_FNAM>
                <CREAT_DATE>2003-07-09</CREAT_DATE>
                <CREAT_TIME>22:19:54</CREAT_TIME>
                <CHANGER_ID>USR28000000001130</CHANGER_ID>
                <CHANG_NAME>LUECKHOFFH</CHANG_NAME>
                <CHANG_FNAM>Hermann Lueckhoff</CHANG_FNAM>
                <CHANG_DATE>2003-07-10</CHANG_DATE>
                <CHANG_TIME>00:00:16</CHANG_TIME>
                <OWNER_ID>USR28000000001130</OWNER_ID>
                <OWNER_NAM>LUECKHOFFH</OWNER_NAM>
                <OWNER_FNAM>Hermann Lueckhoff</OWNER_FNAM>
                <LAST_ACCES>2003-07-10</LAST_ACCES>
                <OBJ_EXPDAT>0000-00-00</OBJ_EXPDAT>
                <SENSITIVTY>O</SENSITIVTY>
                <OBJ_PRIO>5</OBJ_PRIO>
                <NO_CHANGE />
                <PRIORITY>5</PRIORITY>
                <HISTORY />
                <RESUB />
                <RESUB_DATE>0000-00-00</RESUB_DATE>
                <SENDER_ID />
                <SEND_NAM />
                <SEND_FNAM />
                <SEND_DATE>0000-00-00</SEND_DATE>
                <SEND_TIME>00:00:00</SEND_TIME>
                <FORWARD_ID />
                <FORW_NAM />
                <FORW_FNAM />
                <FORW_DATE>0000-00-00</FORW_DATE>
                <FORW_TIME>00:00:00</FORW_TIME>
                <REC_ID />
                <REC_NAM />
                <REC_FNAM />
                <REC_DATE>0000-00-00</REC_DATE>
                <REC_TIME>00:00:00</REC_TIME>
                <EXPRESS />
                <COPY />
                <BLIND_COPY />
                <NO_FORWARD />
                <NO_PRINT />
                <TO_ANSWER />
                <TO_DO_EXPL />
                <TO_DO_GRP>0</TO_DO_GRP>
                <C_TO_DO>0</C_TO_DO>
```

TABLE 1-continued

```
            <C_IN_PROC>0</C_IN_PROC>
            <C_DONE>0</C_DONE>
            <C_EXPRESS>0</C_EXPRESS>
            <C_COPY>0</C_COPY>
            <C_BLIND_CP>0</C_BLIND_CP>
            <C_TO_REPLY>0</C_TO_REPLY>
            <C_ANSWERED>0</C_ANSWERED>
            <C_READ>0</C_READ>
            <C_RECEIVER>0</C_RECEIVER>
            <PROC_TYPE />
            <PROC_NAME />
            <PROC_SYST />
            <PROC_CLINT />
            <SKIP_SCREN />
            <TO_DO_OUT />
            <FREE_DEL />
            <READ />
            <READ_DATE>0000-00-00</READ_DATE>
            <READ_TIME>00:00:00</READ_TIME>
            <TO_DO_STAT />
            <STILL_TODO />
            <REPLY_SENT />
            <RESUB_READ />
            <EXPIRY_DAT>0000-00-00</EXPIRY_DAT>
            <DOC_SIZE>000000000031</DOC_SIZE>
            <EMAIL_CONTENT>Just a test2nd US line3rd
                line</EMAIL_CONTENT>
        </EMAIL>
    </parts>
  </xsl:template>
</xsl:stylesheet>
```

Table 1 end

When the file 132 is an XML document, the act of storing retrieved information therein may include an Extensible Style (sheet) Language (XSL) transaction. The XSL transaction may comprise a style definition for the XML document. That is, the XSL transaction may include the contents of the retrieved information and instructions for where in the XML document to store the retrieved information. When the EMPP 120 includes several services for retrieving different classes of information, each of the services may be associated with a separate XSL style sheet for storing information in the file 132. Table 2 includes an exemplary section of an XSL style sheet corresponding to the XML section in Table 1 above.

TABLE 2

```
- <xsl:stylesheet xmlns:xsl="http://www.w3.org/1999/XSL/Transform" version="1.0">
   <?xml version="1.0" encoding="UTF-8" standalone="no" ?>
- <parts>
    - <EMAIL>
            <DOC_ID>FOL28000000007815RAW28000000005130</DOC_ID>
            <OBJECT_ID>RAW28000000005130</OBJECT_ID>
            <OBJ_TYPE>TXT</OBJ_TYPE>
            <OBJ_NAME>MESSAGE</OBJ_NAME>
            <OBJ_DESCR>HL Test</OBJ_DESCR>
            <OBJ_LANGU>E</OBJ_LANGU>
            <OBJ_SORT />
            <CREATOR_ID>USR28000000001130</CREATOR_ID>
            <CREAT_NAME>LUECKHOFFH</CREAT_NAME>
            <CREAT_FNAM>Hermann Lueckhoff</CREAT_FNAM>
            <CREAT_DATE>2003-07-09</CREAT_DATE>
            <CREAT_TIME>22:19:54</CREAT_TIME>
            <CHANGER_ID>USR28000000001130</CHANGER_ID>
            <CHANG_NAME>LUECKHOFFH</CHANG_NAME>
            <CHANG_FNAM>Hermann Lueckhoff</CHANG_FNAM>
            <CHANG_DATE>2003-07-10</CHANG_DATE>
            <CHANG_TIME>00:00:16</CHANG_TIME>
            <OWNER_ID>USR28000000001130</OWNER_ID>
            <OWNER_NAM>LUECKHOFFH</OWNER_NAM>
            <OWNER_FNAM>Hermann Lueckhoff</OWNER_FNAM>
            <LAST_ACCES>2003-07-10</LAST_ACCES>
            <OBJ_EXPDAT>0000-00-00</OBJ_EXPDAT>
            <SENSITIVTY>O</SENSITIVTY>
            <OBJ_PRIO>5</OBJ_PRIO>
            <NO_CHANGE />
            <PRIORITY>5</PRIORITY>
            <HISTORY />
            <RESUB />
            <RESUB_DATE>0000-00-00</RESUB_DATE>
            <SENDER_ID />
```

TABLE 2-continued

```
        <SEND_NAM />
        <SEND_FNAM />
        <SEND_DATE>0000-00-00</SEND_DATE>
        <SEND_TIME>00:00:00</SEND_TIME>
        <FORWARD_ID />
        <FORW_NAM />
        <FORW_FNAM />
        <FORW_DATE>0000-00-00</FORW_DATE>
        <FORW_TIME>00:00:00</FORW_TIME>
        <REC_ID />
        <REC_NAM />
        <REC_FNAM />
        <REC_DATE>0000-00-00</REC_DATE>
        <REC_TIME>00:00:00</REC_TIME>
        <EXPRESS />
        <COPY />
        <BLIND_COPY />
        <NO_FORWARD />
        <NO_PRINT />
        <TO_ANSWER />
        <TO_DO_EXPL />
        <TO_DO_GRP>0</TO_DO_GRP>
        <C_TO_DO>0</C_TO_DO>
        <C_IN_PROC>0</C_IN_PROC>
        <C_DONE>0</C_DONE>
        <C_EXPRESS>0</C_EXPRESS>
        <C_COPY>0</C_COPY>
        <C_BLIND_CP>0</C_BLIND_CP>
        <C_TO_REPLY>0</C_TO_REPLY>
        <C_ANSWERED>0</C_ANSWERED>
        <C_READ>0</C_READ>
        <C_RECEIVER>0</C_RECEIVER>
        <PROC_TYPE />
        <PROC_NAME />
        <PROC_SYST />
        <PROC_CLINT />
        <SKIP_SCREN />
        <TO_DO_OUT />
        <FREE_DEL />
        <READ />
        <READ_DATE>0000-00-00</READ_DATE>
        <READ_TIME>00:00:00</READ_TIME>
        <TO_DO_STAT />
        <STILL_TODO />
        <REPLY_SENT />
        <RESUB_READ />
        <EXPIRY_DAT>0000-00-00</EXPIRY_DAT>
        <DOC_SIZE>000000000031</DOC_SIZE>
        <EMAIL_CONTENT>Just a test2nd line3rd line</EMAIL_CONTENT>
    </EMAIL>
- <BUPA>
    - <CENTRALDATA>
        <SEARCHTERM1 />
        <SEARCHTERM2 />
        <PARTNERTYPE />
        <AUTHORIZATIONGROUP />
        <PARTNERLANGUAGE>D</PARTNERLANGUAGE>
        <PARTNERLANGUAGEISO>DE</PARTNERLANGUAGEISO>
        <DATAORIGINTYPE />
        <CENTRALARCHIVINGFLAG />
        <CENTRALBLOCK />
        <TITLE_KEY>0002</TITLE_KEY>
        <CONTACTALLOWANCE />
        <PARTNEREXTERNAL />
        <TITLELETTER />
        <NOTRELEASED />
        <COMM_TYPE />
    </CENTRALDATA>
    - <CENTRALDATAPERSON>
        <FIRSTNAME>Harry</FIRSTNAME>
        <LASTNAME>Hirsch</LASTNAME>
        <BIRTHNAME />
        <MIDDLENAME />
        <SECONDNAME />
        <TITLE_ACA1>0001</TITLE_ACA1>
        <TITLE_ACA2 />
        <TITLE_SPPL />
        <PREFIX1 />
        <PREFIX2 />
        <NICKNAME />
```

TABLE 2-continued

```
            <INITIALS />
            <NAMEFORMAT />
            <NAMCOUNTRY />
            <NAMCOUNTRYISO />
            <SEX>2</SEX>
            <BIRTHPLACE />
            <BIRTHDATE>0000-00-00</BIRTHDATE>
            <DEATHDATE>0000-00-00</DEATHDATE>
            <MARITALSTATUS />
            <CORRESPONDLANGUAGE>D</CORRESPONDLANGUAGE>
            <CORRESPONDLANGUAGEISO>DE</CORRESPONDLANGUAGEIS
               O>
            <FULLNAME>Dr. Harry Hirsch</FULLNAME>
            <EMPLOYER />
            <OCCUPATION />
            <NATIONALITY>DE</NATIONALITY>
            <NATIONALITYISO>DE</NATIONALITYISO>
            <COUNTRYORIGIN />
         </CENTRALDATAPERSON>
       - <CENTRALDATAORGANIZATION>
            <NAME1 />
            <NAME2 />
            <NAME3 />
            <NAME4 />
            <LEGALFORM />
            <INDUSTRYSECTOR />
            <FOUNDATIONDATE>0000-00-00</FOUNDATIONDATE>
            <LIQUIDATIONDATE>0000-00-00</LIQUIDATIONDATE>
            <LOC_NO_1>0000000</LOC_NO_1>
            <LOC_NO_2>00000</LOC_NO_2>
            <CHK_DIGIT>0</CHK_DIGIT>
            <LEGALORG />
         </CENTRALDATAORGANIZATION>
       - <CENTRALDATAGROUP>
            <NAMEGROUP1 />
            <NAMEGROUP2 />
            <GROUPTYPE />
         </CENTRALDATAGROUP>
         <E_MAILDATANONADDRESS />
      </BUPA>
</parts>
```

Table 2 end

Thus, the information retrieval may conclude with the retrieved information being stored in an XML document using an XSL transaction.

Referring again to FIG. 2, the retrieved information 134A will be accessed for purposes of applying the particular rule 200 to the retrieved information 134A. As indicated by process flow arrow 214, therefore, the server device 102 accesses in the file 132 the retrieved information 134A that is needed for evaluating the rule 200 The server device uses the identifier included in the fact attribute 202 to access the retrieved information.

In a selected embodiment where the electronic file 132 is an XML document, the identifier in the fact attribute 202 is an XML Path Language (XPath) query. That is, the server device 102 may use an XPath query, while evaluating the rules 200, to access the needed information. The XPath query may specify a node in the XML document where the query is to be performed and rely on a tree structure and logical relationships of the XML document.

The accessed information 134A will be applied in the rule 200 currently being executed, as indicated by the process flow arrow 216. The rule, and the particular one of the actions 204 with which it is associated, may generally have an "If . . . Then . . . " format. That is, the "If" is to be followed by a logical value that is uniquely determined for each rule. The "Then" is to be followed by the action associated with the rule. The rules may have the following general format:

<Fact Attribute> <Operator> <Value>.

The <Fact Attribute> is an operand that acts as a placeholder for the retrieved information 134A (before it is retrieved and accessed). The <Value> is a pre-selected operand that is used in determining whether the rule is met based on the retrieved information. The <Operator> determines a relationship between the <Fact Attribute> and the <Value>. In one example, the <Operator> may determine whether <Fact Attribute> equals <Value>. Other operators may be used to implement different rules.

The following are some examples of rules and their associated actions. In each of these examples the EMPP 120, or one or more of the services 122A, 122B, . . . , may be preconfigured with instructions for retrieving the necessary information for evaluating the particular rule.

EXAMPLE 1

If a sender of the IEM 110 is from Canada, then the IEM is redirected to the individual account 114 that belongs to a Canadian representative of the organization. It may be possible to retrieve the information necessary for this rule from the IEM 110 itself by extracting the sender's email address or by identifying other country-specific information. Alternatively, if there have been previous contacts with the sender of the IEM 110, the organization may have a record of the sender from which the country of residence can be retrieved.

EXAMPLE 2

A specific action is taken if the information that is retrieved for the IEM 110 shows that at least two previous messages with customer complaints have been received from the same sender. The specific action may be to set a high priority for handling the IEM 110 or routing it to the individual account 114 of a particular person within the organization.

EXAMPLE 3

A specific action is taken if the sender of the IEM 110 is a customer of the organization and if the churn rate for this customer is above a threshold level. For example, the organization has analytical software that is part of a customer-relationship management system, by which it can calculate a churn rate, i.e., a rate of customer attrition for an individual customer or collectively for all customers in a market sequent. One example of the specific action taken if the rule is met is sending an automatic confirmation message to the sender that the IEM 110 has been received.

EXAMPLE 4

A response to the IEM 110 is automatically sent. The rule may be preconfigured such that it can be determined whether the nature of IEM 110 is such that an automatic response can be sent. Such an automatic response may be the only response provided to the IEM 110, or it may be a preliminary response. A basic example of when such an automatic response can be used is where the organization has set a deadline for receiving a message on a specific topic, such as responses to an outstanding offer. If the IEM 110 relates to this topic and is received after the deadline, a preconfigured response may be automatically sent.

EXAMPLE 5

A proposed response is compiled and forwarded to the organization employee who is charged with handling the IEM 110. Essentially, the person may receive in his or her individual account 114 the IEM 110 together with the proposed response which includes preconfigured instructions for how to handle the IEM 110. For example, the organization may formulate instructions in advance that relate to a number of foreseeable situations regarding incoming electronic messages. The instructions may be tailored toward circumstances that involve who the sender is, the particular time when the IEM 110 is received, whether there have been complaints from the sender in the past, and the existence or absence of other specific business information in the system 100.

EXAMPLE 6

A rule can be formulated to detect unwanted mass-distributed messages (so-called "spam") using any suitable technique. Conversely, if the IEM 110 is not deleted, one of the actions performed in response to receiving it may be to store information about it that can be used in processing future messages from the same or a related sender. Compare Example 2 above where previously received messages are taken into account.

Other types of rules, and other actions following them, can be used. Indeed, the first repository 126 can include meta information for a virtually endless range of classes of stored fact information. Some examples will be mentioned, with the understanding that certain categories of information may in part overlap, and that the mentioned classes are illustrative only.

Generally, the information to be retrieved may pertain to the business context of the IEM 110 from the organization's perspective. The scope of the business context may be defined in view of the particular activities that the organization is involved with. For example, the business context may comprise an email thread in the email program 108. As another example, the business content may comprise a process in the system 100 that relates to the IEM 110, such as a case, order, contract or another workflow used by the organization. In other words, the organization may decide what is the relevant business context of received messages and configure the server device to retrieve information within that context.

There may be stored fact information available on the server device 102 or in a database to which it has access. The organization may use one or more software applications in its daily activities, such as directory applications, sales applications, inventory management programs, etc. The server device 102 may retrieve information generated or stored by such application(s).

Specific examples of classes of stored fact information include the following. A class may include analytical data, such as a customer rating or a churn rate, for the sender of the IEM 110. A class may include information pertaining to the organization's current ability to handle (and perhaps respond to) the IEM 110. For example, it is relevant to know what organization employees are currently available and which of these available ones have the necessary skill(s) for responding to the IEM 110. Such information can be determined from workforce management programs or skill databases used by the organization, from calendar entries, or other software programs or tools. A class may include information pertaining to communication information relating to the IEM 110, such as information on messages that have previously been sent from the organization to the sender of the IEM 110. A class may include information pertaining to an industry with which the sender of the IEM 110 is associated. For example, if the IEM 110 is sent by a customer in a particular market area, a class of stored fact information may include industry information about that market area or about any competitors of the customer.

The just described examples illustrate that widely different types of fact information may be retrieved depending on what is relevant to processing the incoming messages. It follows that the stored fact information may be found in a great variety of locations. For clarity, the stored fact information 128 in FIGS. 1 and 2 is shown in a single second repository 130. However, the server device 102 may be preconfigured with instructions for how to retrieve information from any location where it may find stored fact information identified by the meta information in the first repository. This may be done by including services 122A, 122B, and so on, that contain instructions for retrieving the respective facts.

Information may be retrieved from the IEM 110 itself (such as the sender name and the text of the message). In selected embodiments, the server device 102 performs an initial screening of the IEM 110 to determine which of the rules 200 should be applied. That is, the rules 200 may be divided into groups that can be evaluated independently of each other. For example, one group of rules may relate to customer emails, a second group of rules may be for emails with inquiries from prospective customers and a third group may relate to emails from consultants. Upon receiving the IEM 110, therefore, the server may do the initial screening and use a result of the screening to select the group of rules to be applied. In other words, the server device 102 may select between different portions of meta information, such as the first meta information 124A and the second meta information 124B, based on the outcome of the initial screening.

Retrieving stored fact information may require searching for it. For example, it may happen that the specific location of relevant information in a database is not fully known, or it may be uncertain whether the information exists at all. The server device 102 may therefore be provided with preconfigured queries for database searches or equivalent to retrieve any information that results from such searches. For example, when the IEM 110 is sent from a company for which the organization has no record, the server device may search publicly available databases of trade associations and other special interest groups in an attempt to discover background information that is relevant for the processing the IEM 110.

As mentioned, the above and other examples of stored fact information can be retrieved by including suitable instructions in the EMPP 120. The organization using the EMPP 120 may also wish to customize the fact retrieval over time. For example, processing a large number of messages may yield valuable experiences as to what retrieved information is most useful in deciding how to route the received messages, and what information is unnecessary or less useful. Accordingly, it may be advantageous to configure the EMPP 120 such that the services 122A, 122B, and so on, can be updated as necessary, for example by omitting any of them or adding others.

The electronic file 132 that contains the retrieved information may be stored in the server device 102 for any length of time. However, storing too much information may affect performance. It may therefore be preferable to delete the file 132 after the processing of the IEM 110 is finished. The file 132 may be provided with a lifetime that specifies how long it should exist. At the end of the lifetime, the server device 102 automatically deletes the file 132. One example of this is that the lifetime of the file 132 may be bound to the workflow 108 that is associated with the IEM 110.

The system 100 can process messages that are sent to one or more addresses. For example, the above described techniques can be applied to all incoming messages or to a selected category of messages. The techniques can be used with any electronic messages including, but not limited to, email. The block components of computer system 100 described above may be separate, as schematically shown in FIG. 1, or joined into one unit. Any of the described block components may reside on a different device than any other component(s).

Figure 3:
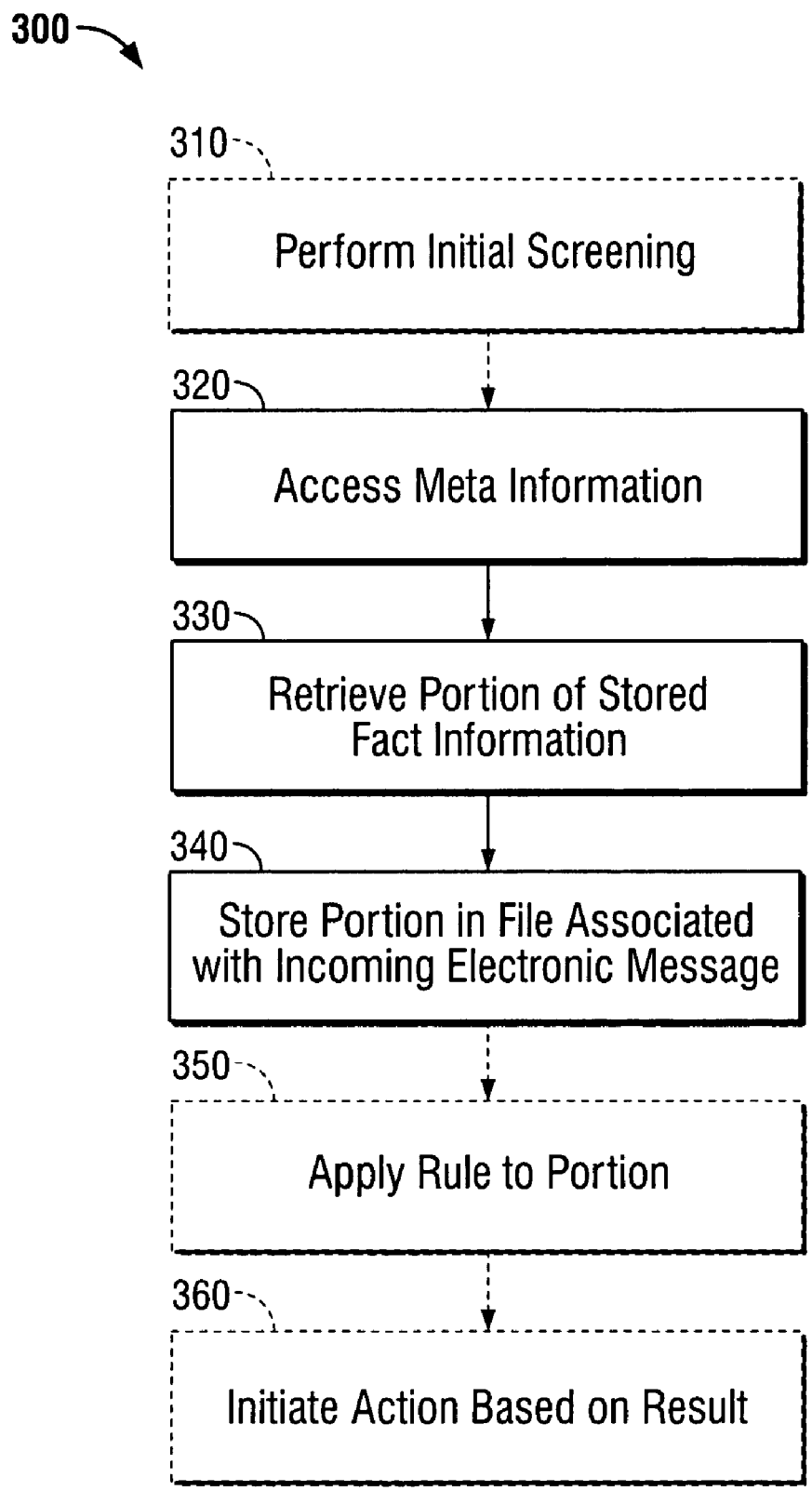
FIGS. 3 and 4 are flow charts of methods.

FIG. 3 is a flow chart of a method 300 according to an embodiment of the invention. Preferably, the method 300 is performed in the system 100. For example, a computer program product can include instructions that cause a processor of the server device 102 to perform the steps of the method 300.

As shown in FIG. 3, the method 300 includes the following steps:

Performing, in optional step 310, an initial screening of the IEM 110 upon receiving it. This may be done for the purpose of configuring the subsequent processing of the IEM 110, such as by selecting a group of rules to be applied or categories of stored fact information that are to be retrieved.

Accessing, in step 320, meta information that identifies a first pre-selected class of stored fact information. The meta information may include rules 200 and fact attributes 202, which can be used in retrieving the specific fact information and in processing the IEM 110.

Retrieving a portion 134A of the stored fact information 128 in step 330. The retrieved portion is a member of the first pre-selected class.

Storing, in step 340, the retrieved portion 134A in an electronic file 132 that is associated with the IEM 110. The retrieved portion 134A is stored such that a rule 200 for processing the IEM 110 can be applied to the retrieved portion 134A.

In optional step 350, applying the rule 200 to the retrieved portion 134A and, in optional step 360, initiating an action 204 by the server device 102 that is based on the result of applying the rule 200.

In an implementation where stored fact information of several different classes are retrieved in step 330, the entire body of fact information identified by all of the meta information may be retrieved before any rule is applied to any of it. This may, however, sacrifice the system's performance if there are conditional rules that end up not being applied. A different approach, which may be referred to as "lazy" retrieval of facts, involves retrieving the stored fact information only when there is a need to apply the rule in which it is used. That is, the server device 102 may sequentially access the rules 200 as described with regard to FIG. 2 above. The server device 102 may initiate fact retrieval, and subsequent storing of retrieved fact information in the file 132, for each rule that is to be applied.

Figure 4:
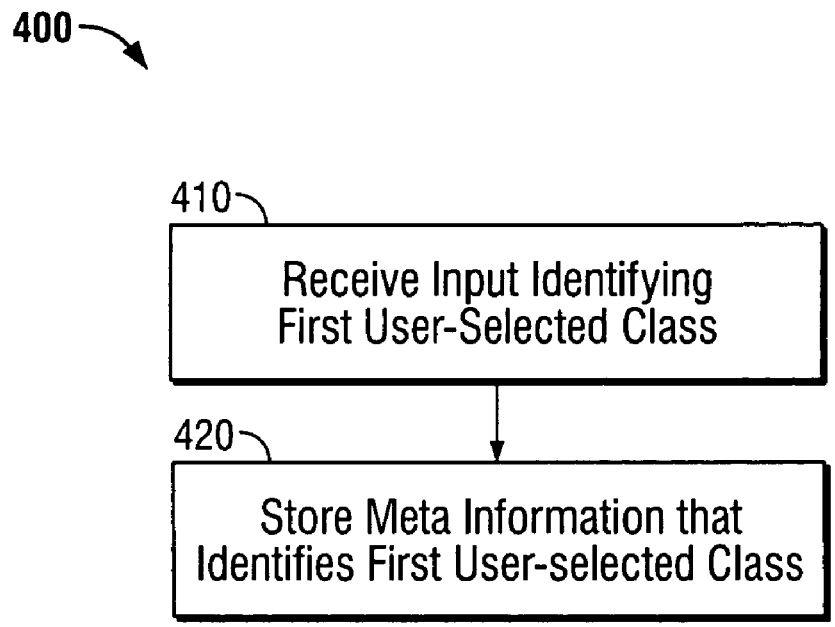

FIG. 4 is a flow chart of a method 400 according to another embodiment of the invention. Preferably, the method 400 is performed in the system 100. For example, a computer program product can include instructions that cause a processor of the server device 102 to perform the steps of the method 400.

As shown in FIG. 4, the method 400 includes the following steps:

Receiving, in step 410, an input that identifies a first user-selected class of stored fact information. Upon receipt of an incoming electronic message, there is to be retrieved information that is a member of the first user-selected class.

Storing, in step 420, meta information in a repository that is accessed upon receipt of the incoming electronic message. The meta information identifies the first user-selected class such that a portion of the stored fact information that is a member of the first class can be retrieved upon accessing the meta information.

Figure 5:
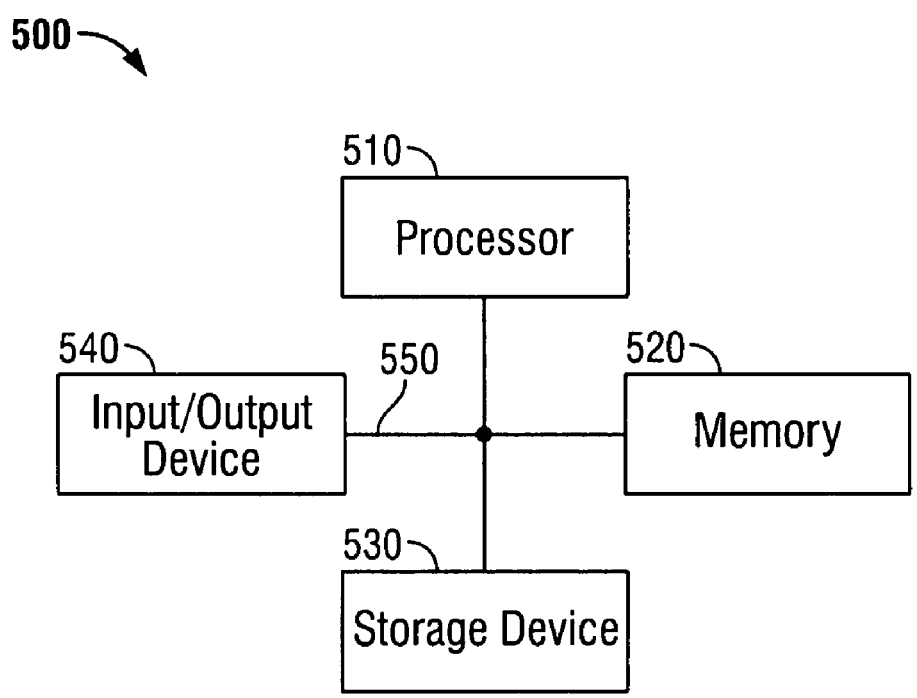
FIG. 5 is a block diagram of a computer system.

FIG. 5 is a block diagram of a computer system 500 that can be used in the operations described above, according to one embodiment. The system 500 includes a processor 510, a memory 520, a storage device 530 and an input/output device 540. Each of the components 510, 520, 530 and 540 are interconnected using a system bus 550. For example, the server device 102 may include the components 510, 520, 530 and 540.

The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530, including for receiving or sending information through the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces. For example, the input described with regard to step 410 of method 400 above may be received using the input/output device 540.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in a computer system for responding to received electronic messages, the method comprising:
   (a) receiving, at a computer system, an incoming electronic message addressed to a general message account not assigned to any specific user;
   (b) identifying, by the computer system, stored fact information that is related to and external to the incoming electronic message such that subsequent analysis of the stored fact information provides an indication of how to route the incoming electronic message, wherein identifying comprises:
      (i) upon receipt of the incoming electronic message in the computer system, selecting a first meta information from a plurality of meta information portions based on information retrieved from the incoming electronic message, wherein each meta information includes a rule and a fact attribute identified by the rule, wherein:
         (A) the fact attribute specifies a pre-selected class of stored fact information that is associated with the incoming electronic message, wherein the stored fact information is external to the incoming electronic message, and
         (B) the rule is associated with an action performed by the computer system with regard to the incoming electronic message when the rule is met by the pre-selected class of stored fact information specified by the fact attribute;
      (ii) accessing at least the first meta information of the plurality of meta information portions stored in the computer system, the first meta information including a first rule and a first fact attribute;
      (iii) determining a first pre-selected class of a plurality of classes of stored fact information from the first fact attribute and a first service of a plurality of services from the first fact attribute, wherein the first service is specified by the first fact attribute and includes executable instructions for retrieving at least a first portion of the first pre-selected class of stored fact information;
   (c) retrieving by the computer system, at least part of the identified store fact information in preparation for the subsequent analysis to determine how to route the incoming electronic message, by retrieving at least the first portion of the stored fact information that is a member of the first pre-selected class using the first service; and
   (d) storing, by the computer system, the retrieved stored fact information for subsequent analysis to determine how to route the incoming electronic message by storing the first retrieved portion of the stored fact information in a markup language formatted electronic file that is associated with the incoming electronic message, wherein the markup language formatted electronic file is configured to permit the first rule to be subsequently applied to the first retrieved portion to determine how to route the incoming electronic message.

2. The method of claim 1, wherein the first portion of the stored fact information is retrieved when there is a need to apply the rule.

3. The method of claim 1, wherein the computer system includes a workflow for processing the incoming electronic message and wherein the method further comprises providing the electronic file with a lifetime bound to the workflow.

4. The method of claim 1, wherein the electronic file is an XML document and the retrieved portion is stored in the XML document using an XSL transaction.

5. The method of claim 1, further comprising performing an initial screening of the incoming electronic message before accessing the meta information, wherein a result of the initial screening is used to select the first rule from a plurality of rules.

6. The method of claim 1, wherein the meta information further includes an identifier specifying where the retrieved first portion of stored fact information is to be stored in the electronic file, and wherein the identifier is used in storing the retrieved first portion.

7. The method of claim 6, further comprising using the identifier to access the retrieved first portion of stored fact information in the electronic file to apply the first rule to the retrieved first portion.

8. The method of claim 6, wherein the identifier is an XPath query.

9. The method of claim 1, wherein the retrieved first portion of the stored fact information pertains to at least one category selected from the group consisting of: a business context of the incoming electronic message, analytical data relating to the incoming electronic message, availability of a person for attending to the incoming electronic message, a skill of a person for attending to the incoming electronic message, communication information relating to the incoming electronic message, an industry with which the incoming electronic message is associated, and combinations thereof.

10. A computer program product tangibly embodied in a computer readable storage medium and containing executable instructions that when executed cause a processor to perform operations comprising:
(a) receiving, at a computer system, an incoming electronic message addressed to a general message account not assigned to any specific user;
(b) identifying, by the computer system, stored fact information that is related to and external to the incoming electronic message such that subsequent analysis of the stored fact information provides an indication of how to route the incoming electronic message, wherein identifying comprises:
(i) upon receipt of the incoming electronic message in the computer system, selecting a first meta information from a plurality of meta information portions based on information retrieved from the incoming electronic message, wherein each meta information includes a rule and a fact attribute identified by the rule, wherein:
(A) the fact attribute specifies a pre-selected class of stored fact information that is associated with the incoming electronic message, wherein the stored fact information is external to the incoming electronic message, and
(B) the rule is associated with an action performed by the computer system with regard to the incoming electronic message when the rule is met by the pre-selected class of stored fact information specified by the fact attribute;
(ii) accessing the first meta information stored in the computer system, the first meta information including a first rule and a first fact attribute;
(iii) determining a first pre-selected class of a plurality of classes of stored fact information from the first fact attribute and a first service of a plurality of services from the first fact attribute, wherein the first service is specified by the first fact attribute and includes executable instructions for retrieving at least a first portion of the first pre-selected class of stored fact information;
(b) retrieving, by the computer system, at least part of the identified stored fact information in preparation for the subsequent analysis to determine how to route the incoming electronic message, by retrieving at least the first portion of the stored fact information that is a member of the first pre-selected class using the first service; and
(c) storing, by the computer system, the retrieved stored fact information for subsequent analysis to determine how to route the incoming electronic message by storing the first retrieved portion of the stored fact information in a markup language formatted electronic file that is associated with the incoming electronic message, wherein the markup language formatted electronic file is configured to permit the first rule to be subsequently applied to the first retrieved portion to determine how to route the incoming electronic message.

11. The computer program product of claim 10, wherein the first portion of the stored fact information is retrieved when there is a need to apply the rule.

12. The computer program product of claim 10, wherein the computer system includes a workflow for processing the incoming electronic message, and wherein the operations further comprise:
providing the electronic file with a lifetime bound to the workflow.

13. The computer program product of claim 10, the operations further comprising:
performing an initial screening of the incoming electronic message before accessing first the meta information; and
using a result of the initial screening to select the first rule from a plurality of rules.

14. A computer system comprising:
an electronic messaging system in which an incoming electronic message addressed to a general message account not assigned to any specific user is received;
a first repository with stored fact information that is external to the incoming electronic message, wherein the stored fact information is configured to be subsequently analyzed to provide an indication of how to route the incoming electronic message;
a second repository with meta information that identifies a first pre-selected class of a plurality of classes of the stored fact information; and
a program product tangibly embodied in a computer readable storage medium and including executable instructions that when executed cause the computer system, upon receipt of the incoming electronic message, (a) to identify a portion of the stored fact information that is related to and external to the incoming electronic message such that subsequent analysis of the stored fact information provides an indication of how to route the incoming electronic message, wherein identifying comprises the computer system being caused: (i) to select a first meta information from a plurality of meta information portions based on information retrieved from the incoming electronic message, wherein each meta information includes a rule and a fact attribute identified by the rule, wherein: (A) the fact attribute specifies a pre-selected class of stored fact information that is associated with the incoming electronic message, wherein stored fact information is external to the incoming electronic message, and (B) the rule is associated with an action performed by the computer system with regard to the incoming electronic message when the rule is met by the pre-selected class of stored fact information specified by the fact attribute, (ii) to access the first meta information in the second repository, the first meta information including a first rule and a first fact attribute, (iii) to determine the first pre-selected class of a plurality of classes of stored fact information from the first fact attribute and a first service of a plurality of services from the first fact attribute, wherein the first service is specified by the first fact attribute and includes executable instructions for retrieving at least a first portion of the first pre-selected class of stored fact information, (b) to retrieve at least part of the identified stored fact information in preparation for the subsequent analysis to determine how to route the incoming electronic message, by retrieving at least the first portion of the stored fact information from the first repository using the first service, the retrieved portion being a member of the first pre-selected class, and (c) to store the retrieved stored fact information for subsequent analysis to determine how to route the incoming electronic message by storing the first retrieved portion in a markup language formatted electronic file that is associated with the incoming electronic message, wherein the markup language formatted file is configured to permit the first rule to be subsequently applied to the first retrieved portion to determine how to route the incoming electronic message.

15. The computer system of claim 14, wherein the executable instructions further cause the computer system to retrieve the first portion of the stored fact information when there is a need to apply the rule.

16. The computer system of claim 14, further comprising a workflow for processing the incoming electronic message, wherein the electronic file has a lifetime bound to the workflow.

17. The computer system of claim 14, wherein the electronic file is an XML document and the retrieved portion is stored in the XML document using an XSL transaction.

18. The computer system of claim 14, wherein the meta information further includes an identifier specifying where the retrieved first portion of stored fact information is to be stored in the electronic file, and wherein the executable instructions cause the computer system to use the identifier in storing the retrieved first portion.

19. The computer system of claim 18, wherein the executable instructions cause the computer system to use the identifier in accessing the retrieved first portion of stored fact information to apply the first rule to the retrieved portion.

20. The computer system of claim 18, wherein the identifier is an XPath query.

* * * * *